United States Patent [19]

Grigorian et al.

[11] 4,261,168

[45] Apr. 14, 1981

[54] APPARATUS FOR PREVENTING ENTRY OF FOREIGN OBJECTS INTO AIRCRAFT POWER PLANT

[76] Inventors: Karen K. Grigorian, ulitsa Mnevniki, 6, kv. 48; Mikhail G. Mirimsky, ulitsa Marshala Timoshenko, 28, kv. 16; Igor B. Movchanovsky, Stoleshnikov pereulok, 14, kv. 20, all of, Moscow; Fagim S. Gelmedov, kvartal 3a, 6, kv. 58, Lytkarino Moskovskoi oblasti; Samuil I. Ginzburg, ulitsa 2 Sinichkina, 22, kv. 27, Moscow; Lev E. Olshtein, ulitsa Krupskoi, 13, kv. 67, Moscow; Viktor G. Ferapontov, ulitsa Pavla Andreeva, 28, kv. 228, Moscow, all of U.S.S.R.

[21] Appl. No.: 80,295

[22] Filed: Oct. 1, 1979

[51] Int. Cl.$^3$ .............................................. F02C 7/052
[52] U.S. Cl. ........................... 60/39.09 P; 415/121 G; 55/306
[58] Field of Search .............. 60/39.09 P; 415/121 G; 55/306

[56] References Cited

U.S. PATENT DOCUMENTS

| 3,362,155 | 1/1968 | Driscoll | 60/39.09 P |
|---|---|---|---|
| 3,720,045 | 3/1973 | Murphy | 60/39.09 P |
| 3,979,903 | 9/1976 | Hull et al. | 60/39.09 P |

*Primary Examiner*—Louis J. Casaregola
*Attorney, Agent, or Firm*—Burgess, Ryan and Wayne

[57] ABSTRACT

An apparatus is designed for preventing entry of foreign objects into an aircraft power plant. The apparatus comprises a rotor kinematically associated with a drive. The rotor is disposed in a duct between an air intake and an engine, and has a center body with radial blades secured thereon. The blades are installed at an angle to the plane which is square with the longitudinal axis of the rotor. The apparatus has a foreign object collection chamber with an opening for entry of foreign objects, disposed in front of the blades in the direction of air flow.

The blades are installed relative to one another with an angular pitch determined from the equation:

$$\Psi = K_1 \cdot \cos\left(\text{arc tg} \frac{K_2}{\sqrt{\frac{\sigma}{\gamma} \cdot n}}\right),$$

where
 $\psi$ is the angular pitch of blades;
 $K_1$ is the dimensionless coefficient dependent on the shape of blades;
 $K_2$ is the dimensionless coefficient dependent on the ratio of diameters of the duct and center body to the maximum possible air flow rate at the engine inlet;
 $\sigma$ is the ultimate strength of the material of blades;
 $\gamma$ is the specific weight of the material of blades;
 n is the dimensionless factor of safety of blades.

In the proposed apparatus, foreign objects are thrown away by the blades in the direction opposite the location of the engine.

5 Claims, 5 Drawing Figures

APPARATUS FOR PREVENTING ENTRY OF FOREIGN OBJECTS INTO AIRCRAFT POWER PLANT

BACKGROUND OF THE INVENTION

The present invention relates to apparatuses ensuring separation of foreign objects from a gas flow and more particularly to apparatuses for preventing entry of foreign objects into an aircraft power plant.

An apparatus according to the present invention may be most effectively used on those aircraft which are able to take off and land on airfields which are not adapted to remove foreign objects from a runway. In addition, the invention may also be used to the best advantage on those aircraft the power plant air intakes of which are disposed comparatively close to the surface of earth and are not shielded from the latter by other elements of the aircraft structure.

The invention may also be used on transport means utilizing gas turbine engines with air intakes arranged so that they are liable to entry of foreign objects.

Entry of foreign objects in the air intake may be caused by a whirlwind formed between the surface of an airfield ground and the air intake due to a drop of air pressure in the stream drawn in by the engine.

Another cause responsible for entry of foreign objects may be attributed to throwing up of the latter by the aircraft nose wheel.

Still another cause of entry of foreign objects in the power plant may be associated with gusts brought about in a windy weather or by movement of other aircraft on the airfield.

Entry of foreign objects in a power plant is accompanied by their impact against the blades of a gas turbine compressor, rotating at a high speed. An impact of foreign objects against the compressor blades leads to a substantial decrease in the strength thereof and frequently to destruction of these blades, which in turn reduces the service life of the whole engine. Destruction of the blades may cause an aircraft accident.

Therefore, the prevention of entry of foreign objects into an aircraft power plant makes it possible not only to increase the economy of an aircraft operation but also to avoid an aircraft accident.

Known in the prior art is an apparatus for preventing entry of foreign objects in an aircraft power plant. The apparatus comprises a rotor kinematically associated with a drive. The rotor drive is presented by a separate stage of an engine turbine. The rotor is disposed in an air duct intermediate an air intake and an engine.

The rotor has a centre body with radial blades secured thereon. The blades are installed at an angle to the plane which is square with the longitudinal axis of the rotor. Besides, the known apparatus has a foreign object collection chamber with an opening for entry of these objects.

The rotor blades form an additional pressure stage of the engine compressor. The additional pressure stage is provided with a variable inlet stator and straightening vanes arranged at the exit of air flow from this stage.

The foreign object collection chamber is provided with a branch pipe for exit of air intended to vary the air flow rate through the engine. Mounted in this branch pipe is a flap the control linkage of which is connected with an air flow regulator.

The opening for entry of foreign objects is disposed after an annular duct leading thereto and is also annular in shape. The opening for entry of foreign objects is arranged concentrically with an air duct of the engine compressor after the additional pressure stage thereof and after the annular duct leading to this opening.

In the given case, the apparatus for preventing entry of foreign objects is integrated into the engine construction as its component part. After the additional pressure stage, the air duct is branched off into an annular duct leading to the opening for entry of foreign objects in the collection chamber and an air duct of the compressor, both ducts being disposed concentrically. These concentrically disposed ducts form a certain angle relative to each other (cf. U.S. Pat. No. 3,979,903).

The known apparatus does not generally ensure complete protection of the power plant from entry of foreign objects, inasmuch as the air duct branching off after the additional pressure stage does not necessarily prevent foreign objects from being entrained by the air flow after the additional pressure stage and passed to the compressor.

As the angle between the annular duct leading to the opening for entry of foreign objects and the air duct of the engine compressor after the additional pressure stage is comparatively small, a repeated entrainment of foreign objects by the air flow is quite possible.

Integration of the engine and the apparatus for preventing entry of foreign objects into a power plant in a single unit restricts the field of possible applications of the apparatus and may cause difficulties in its application in those cases when the use of an engine of the given construction is not optimum.

In addition, the known apparatus sets up an increased hydraulic resistance owing to the air duct branching off at a portion after the additional pressure stage.

It is an object of the present invention to provide an apparatus for preventing entry of foreign objects into an aircraft power plant, wherein rotor blades are installed relative to one another and to an opening of a collection chamber for entry of foreign objects so as to ensure a practically complete prevention of entry of foreign objects into the power plant.

It is another important object of the present invention to provide an apparatus for preventing entry of foreign objects into an aircraft power plant, wherein rotor blades are installed relative to one another and to an opening in a collection chamber for entry of foreign objects so as to reduce the hydraulic resistance of the apparatus at those ratings of the power plant operation when there is no need for protection against foreign objects.

It is a further object of the present invention to provide an apparatus for preventing entry of foreign objects into an aircraft power plant, which should be simple in design, inexpensive and not complicated to manufacture.

It is still another important object of the present invention to provide an apparatus for preventing entry of foreign objects into an aircraft power plant, which should improve operation of the power plant at those ratings when there is no danger of entry of foreign objects by reducing the non-uniformity of air pressure and velocity fields in front of the compressor.

BRIEF DESCRIPTION OF THE INVENTION

These and other objects of the invention are accomplished in an apparatus for preventing entry of foreign objects into an aircraft power plant, comprising a rotor kinematically associated with a drive, disposed in a duct between an air intake and an engine and having a centre cone with radial blades secured thereon and installed at an angle to the plane which is square with the longitudinal axis of the rotor, and also a foreign object collection chamber with an opening for entry of foreign objects, according to the invention, the blades are installed relative to one another with an angular pitch determined from the equation:

$$\Psi = K_1 \cdot \cos\left(\arctan \frac{K_2}{\sqrt{\frac{\sigma}{\gamma} \cdot n}}\right),$$

where
$\psi$ is the angular pitch of blades;
$K_1$ is the dimensionless coefficient dependent on the shape of blades;
$K_2$ is the dimensionless coefficient dependent on the ratio of diameters of the duct and centre body from the maximum possible air flow rate at the engine inlet;
$\sigma$ is the ultimate strength of the material of blades;
$\gamma$ is the specific weight of the material of blades;
n is the dimensionless factor of safety of blades,
the collection chamber opening for entry of foreign objects being disposed in front of the rotor blades in the direction of air flow.

With the blades so installed, the time at which each blade will turn, during rotation of the rotor, through an angle corresponding to a clearance between the blades is less than the time required for a foreign object to fly a distance equal to the blade projection on the plane passing through the longitudinal axis of the rotor.

Therefore, in its motion, each foreign object will surely encounter one of the rotor blades and will be thrown towards the opening for entry of foreign objects in the collection chamber assigned for this purpose.

During operation of the power plant at ratings when there is no danger of entry of foreign objects, the rotor blades offer a substantially low resistance to the air flow and equalize the air pressure and velocity fields in front of the engine compressor.

Preferably, a shroud with turbine blades arranged thereon should be rigidly secured on the tips of rotor blades and a nozzle box with a manifold should be installed at a certain distance from free tips of the turbine blades, the nozzle box and the manifold communicating with an air source intended for delivery of air to the turbine blades.

The provision of the shroud ensures a decrease of the stress in the radial blades of the rotor, thereby providing an increase in the rotor strength.

The turbine blades caused to rotate by the air flow from the nozzle box communicating through the manifold with the air source serve as a drive of the rotor. Arrangement of the turbine blades on the shroud and installation of the nozzle box with the manifold communicating with the air source make it possible to deliver air and to shut off the delivery of air with substantial ease, and thus to cut in and out the apparatus embodied according to the present invention.

Increased strength of the blades allows the rotor to be rotated at a speed greater, from the standpoint of strength, than the speed allowable for rotation of the rotor not provided with a shroud. The increase of rotational speed makes it possible to reduce the number of rotor radial blades and thus to decrease the hydraulic resistance.

It is advantageous to have the engine compressor as a source of air.

When the engine compressor is used as a source of air, no power source is required other than the engine being protected against the entry of foreign objects.

It is also advantageous to have the atmosphere as a source of air communicating with the nozzle box through openings made in the air intake external wall, each opening being provided with a flap door for its closing when the apparatus is not in operation.

The use of the atmosphere obviates the necessity for power sources. At those ratings of the power plant operation when it is required to prevent entry of foreign objects, the pressure of atmospheric air is greater than the pressure of air drawn in by the engine.

Therefore, the atmospheric air acting on the turbine blades may cause the rotor to rotate without use of any other power source.

The provision of flaps makes it possible to shut off the delivery of atmospheric air at those ratings of the power plant operation when there is no need for protection against the ingestion of foreign objects. This takes place when the pressure of air delivered into the engine increases after the aircraft has gained a certain speed of movement, for example, the speed required for take-off.

It is advisable to have the engine compressor and the atmosphere as a source of air communicating with the nozzle box through an ejector installed at the air flow inlet of the manifold.

Due to the fact that the nozzle box communicates with the compressor and the atmosphere through the ejector, it becomes possible to get the velocity of air delivered from the nozzle box to the turbine blades to be optimum from the standpoint of attaining the maximum efficiency of the drive operation.

In this case the air rate in the compressor is less when compared with the case of using only the compressor as a source of air.

The apparatus according to the present invention ensures a reliable and practically complete protection of the power plant against the entry of foreign objects, inasmuch as all the foreign objects are thrown in the direction opposite the location of the engine.

Along with this, the apparatus of the present invention does not require an air duct of any special shape and does not increase the hydraulic resistance of a power plant at those ratings of its operation when there is no danger of entry of foreign objects.

In addition, the apparatus according to the present invention does not require any special drive, is substantially economical in operation, and is simple and inexpensive to manufacture.

BRIEF DESCRIPTION OF THE DRAWINGS

To enable the invention to be understood more clearly, the preferred embodiments thereof will be more fully described hereafter with reference to the accompanying drawings, wherein.

Figure 1:
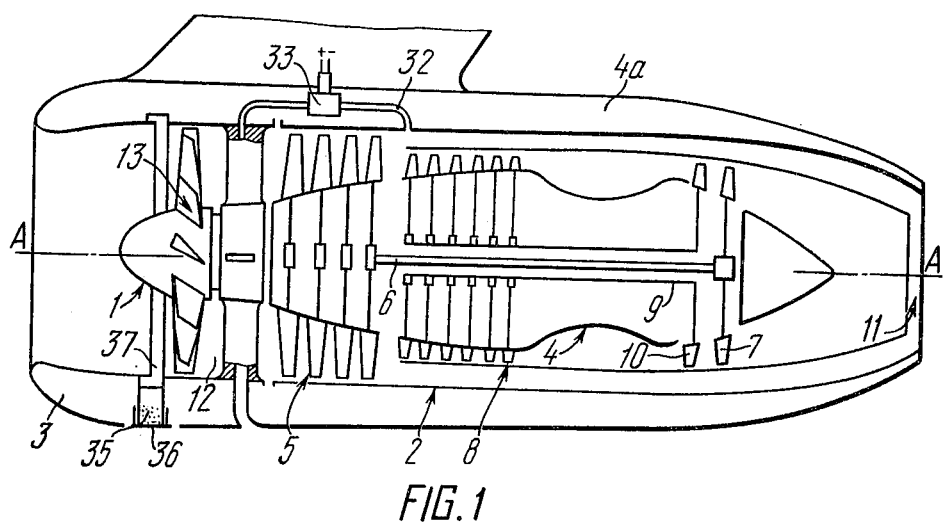
FIG. 1 is a diagrammatical view, partly in longitudinal section of an aircraft power plant with an apparatus for preventing entry of foreign objects thereinto according to the invention.

A proposed apparatus 1 (FIG. 1) is intended to prevent entry of foreign objects into a power plant 2 of an aircraft.

DETAILED DESCRIPTION OF THE INVENTION

The power plant 2 of the aircraft comprises an air intake 3 and a gas turbine engine 4 disposed in tandem in the direction of air flow.

The engine 4 is enclosed in a pod 4a suspended from the aircraft (not shown) and provided with a low-pressure compressor 5 connected by way of a shaft 6 with a second stage 7 of a turbine of the engine 4.

A high-pressure compressor 8 is connected by way of a shaft 9 with a first stage 10 of the turbine of the engine 4.

A reaction nozzle 11 is disposed after the turbine.

The air intake 3 communicates with the engine 4 through the medium of a cylindrical duct 12.

The apparatus 1 comprises a rotor 13 disposed in the duct 12.

The rotor 13 (FIGS. 1, 2) comprises a centre body 14 arranged along the axis A—A of the power plant 2. Provided in the front portion of the centre cone 14 is a cover 15 (FIG. 2) which closes a central opening of the centre cone 14 made for convenience in mounting of the centre body 14.

The centre body 14 is hollow to reduce the weight of the entire construction of the apparatus 1 and incorporates internal ribs 16 and 17 resting through bearings 18, being of any design suitable for this purpose, on an immovable axle 19 having a stepped form and changing at its end into a disc 20 which is arranged square with the axle 19.

Figure 2:
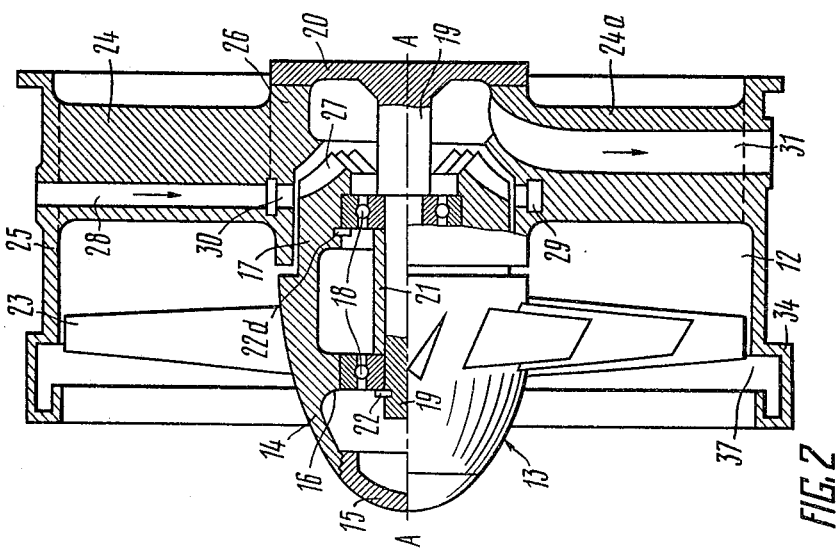
FIG. 2 is a diagrammatical view, partly in longitudinal section, of an apparatus for preventing entry of foreign objects into an aircraft power plant according to the invention.

A distance bushing 21 is disposed intermediate the bearings 18. Each of the bearings 18 is fixed by thrust rings 22 and 22a to prevent any longitudinal displacement. The left-hand, as shown in FIG. 2, bearing 18 is fixed by the thrust ring 22 and the distance bushing 21. The right-hand, as shown on FIG. 2, bearing 18 is fixed by the thrust ring 22a, the distance bushing 21 and a projection of the rib 17.

Rigidly secured on the centre body 14 are radial blades 23 installed at an angle to the plane which is square with the axis A—A of the rotor 13. The angle of inclination of each blade 23 gradually diminishes from that portion of this blade by which it is secured in the centre body 14 towards the tip of the blade 23. Such a decrease of this angle is required in order to ensure a uniform motion of the air flow throughout the entire section of the duct 12.

The blade 23 has a straight profile. Disposed in the duct 12 are radial struts 24 and 24a the external circumferential ends of which depart from a wall 25 of the duct 12. The internal ends of the struts 24 and 24a change into an annular portion 26 rigidly secured to the disc 20 and arranged concentrically with the axle 19. Installed between the annular portion 26 and axle 19 are turbine blades 27 secured on the centre body 14.

Incorporated in the radial strut 24 is a radial duct 28 intended for delivery of air flow to the turbine blades 27 through a manifold 29 and a nozzle box 30. The manifold 29 is essentially an annular cavity communicating with the radial duct 28.

The nozzle box 30 is formed by shaped vanes (not shown) equally spaced around the blades 27. The manifold 29 and the nozzle box 30 are intended for acceleration and distribution of air flow passing from the duct 28 towards the turbine blades 27.

The turbine blades 27 rotated by the air flow serve as a drive of the rotor 13.

Incorporated in the radial strut 24a is a radial duct 31 which is in communication with the atmosphere and is intended to let out the air passing from the turbine blades 27. The duct 28 communicates with the outlet of the compressor 5 through a pipeline 32 (FIG. 1).

Mounted in the pipeline 32 is an electric-actuated valve 33 connected to a power source (not shown). The electric-actuated valve 33 may be of any design suitable for this purpose, which is not described here in order not to obscure the essence of the invention.

The apparatus 1 also comprises a foreign object collection chamber 34 (FIG. 2). The collection chamber 34 is formed by the internal wall 25 of the duct 12 and is annular in shape. Provided after the lower, as shown on FIG. 1, portion of the collection chamber 34 is a foreign object storage pocket 35 (FIG. 1) with an outlet opening closed by a cover 36. The collection chamber 34 has an annular opening 37 (FIGS. 1 and 2) present in the wall 25 for entry of foreign objects. The opening 37 is disposed in front of the blades 23 of the rotor 13 in the direction of air flow.

According to the invention, the blades 23 of the rotor 13 are installed relative to one another with an angular pitch determined from the equation:

$$\psi = K_1 \cdot \cos\left(\text{arctg}\frac{K_2}{\sqrt{\frac{\sigma}{\gamma} \cdot n}}\right),$$

where
  $\psi$ is the angular pitch of the blades 23 in radians;
  $K_1$ is the dimensionless coefficient dependent on the shape of the blades 23 of the rotor 13 and usually found in the range of 0.3 to 0.35;
  $K_2$ is the dimensionless coefficient dependent on the ratio of diameters of the duct 12 and the centre body 14 to the maximum possible air flow rate at the inlet of the engine 4 usually found in the range of 35 to 45;
  $\sigma$ is the ultimate strength of the material of the blades 23 in $kgf/cm^2$;

γ is the specific weight of the material of the blades 23, in kg/cm³;

n is the dimensionless factor of safety of the blades 23.

The aforementioned equation has been determined proceeding from the condition that the rotational speed of the rotor is limited by the strength of the blades 23 under the action of a centrifugal force.

Another condition that defines this equation is the requirement for the time at which each blade 23 will turn, during rotation of the rotor 13, through an angle corresponding to the clearance between the blades 23 to be less than the time required for a foreign object to fly a distance equal to the projection of the blade 23 on the plane passing through the longitudinal axis A—A of the rotor 13.

Due to the fact that the blades 23 are installed in the manner defined by the aforementioned equation, not a single foreign object can practically enter the engine 4 through that portion of the duct 12 wherein the blades 23 are disposed. One of the blades 23 will surely throw away a foreign object in the direction opposite the location of the engine 4, towards the opening 37.

Figure 3:
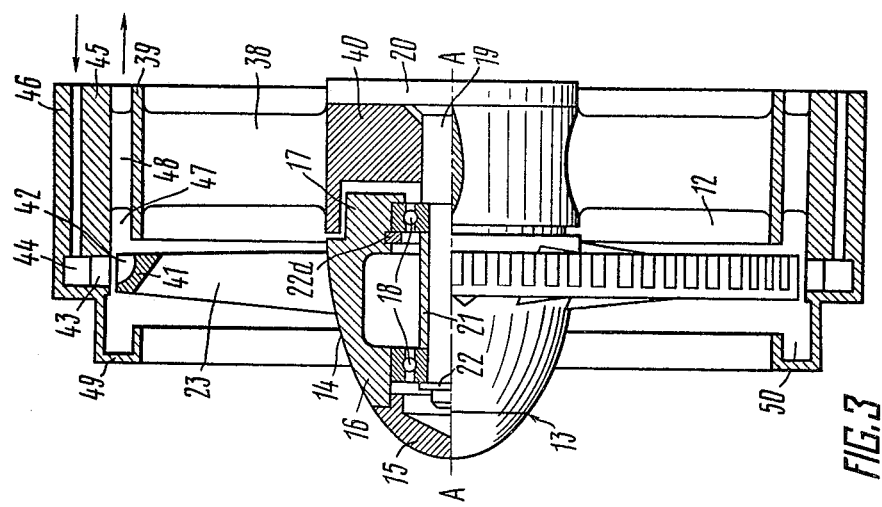
FIG. 3 is a diagrammatical view, partly in longitudinal section, of an apparatus according to the present invention, comprising a shroud with turbine blades arranged thereon, which is rigidly secured on rotor blades, and also a nozzle box and a manifold communicating with the engine compressor.

In another embodiment of the apparatus 1 shown in FIG. 3, the centre body 14 with the cover 15, the ribs 16 and 17, the bearings 18, the axle 19, with the disc 20, the bushing 21, the rings 22 and 22a and the radial blades 23, that is all the elements of the construction designated by reference numerals 14, 15, 16, 17, 18, 19, 20, 21, 22, 22a, 23, are of the same construction as that heretofore described and illustrated in FIG. 2.

In the embodiment of the apparatus 1 according to FIG. 3, the turbine blades 27, the manifold 29, the nozzle box 30 and also the ducts 28 and 31 made in the struts 24 and 24a are not used in the construction.

In the construction illustrated in FIG. 3, there are provided solid radial struts 38 the external circumferential ends of which depart from a wall 39 of the duct 12. The internal ends of the radial struts 38 change into an annular portion 40 rigidly secured to the disc 20 and the axle 19. The annular portion 40 is arranged concentrically with the axle 19.

In such an embodiment, the apparatus 1 comprises a shroud 41 rigidly secured on the tips of the blades 23. The surface of the shroud 41 facing the axis A—A is in the form of a convergent cone.

Turbine blades 42 are arranged on the external surface of the shroud 41.

A nozzle box 43 with a manifold 44 is installed at a certain distance from free tips of the turbine blades 42.

The manifold 44 is essentially an annular cavity in the thickened portion of a wall 45. The wall 45 is integral with the wall 39 of the duct 12.

The nozzle box 43 is also in thickened portion of the wall 45 and is formed by shaped vanes (not shown) equally spaced around the shroud 41.

The nozzle box 43 is disposed between the manifold 44 and the turbine blades 42.

In the wall 45 are ducts 46 which run substantially parallel to the axis A—A.

The ducts 46 are intended for connecting the manifold 44 and the nozzle box 43 with the pipeline 32 for delivery of air to the turbine blades 42.

Between the wall 45 and the wall 39 of the duct 12 is an annular duct 47 which also runs parallel to the axis A—A and is intended to let out the air passing from the turbine blades 42. The duct 47 accommodates longitudinal ribs 48 intended for connection of the walls 39 and 45 which, in this particular case, are made integral.

The apparatus 1 of the given embodiment comprises a foreign object collection chamber 49. Walls of the collection chamber 49 are integral with the wall 45. The collection chamber 49 is defined by a surface of the shroud 41 facing the collection chamber 49. This surface of the shroud 41 is disposed on the side opposite that on which the turbine blades 42 are arranged.

The collection chamber 49 has an annular opening 50 for entry of foreign objects. In such an embodiment of the apparatus 1, air is readily delivered to the turbine blades 42 and it becomes possible to reduce the thickness of the struts 38. Therefore, the construction of the apparatus 1 is simplified and due to the reduction in thickness of the struts 38, the cross-section of the duct 12 is increased for passage of air flow.

The delivery of air to the turbine blades 42 arranged on the shroud 41 increases the torque of the drive, thereby making it possible to decrease the pressure or consumption of air delivered to the turbine blades 42.

Figure 4:
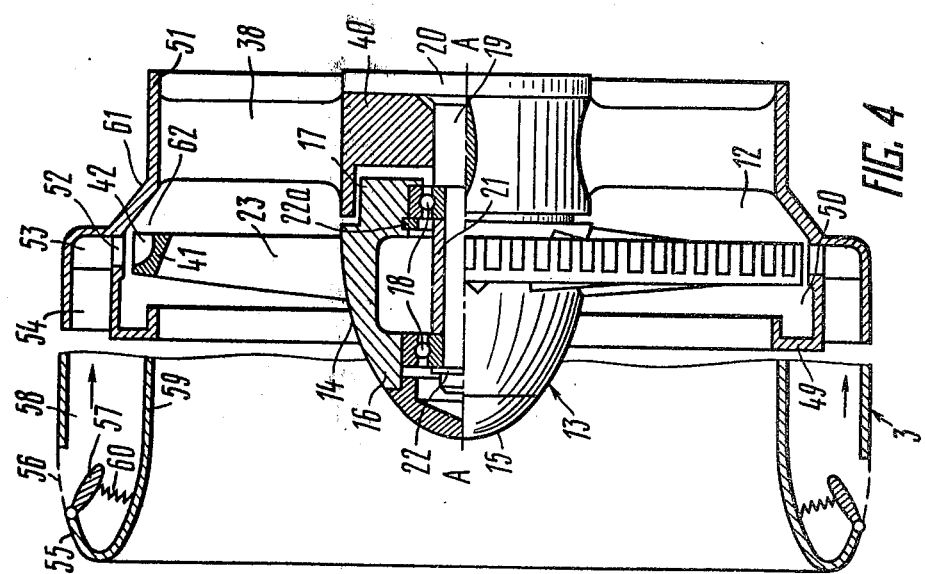
FIG. 4 is a diagrammatical view, partly in longitudinal section, of part of an air intake and an apparatus according to the present invention, comprising a shroud with turbine blades arranged thereon, which is rigidly secured on rotor blades, and also a nozzle box and a manifold communicating with the atmosphere through openings with flap doors in the external wall of an air intake.

In an embodiment illustrated in FIG. 4, the rotor 13, the radial struts 38 with the annular portion 40, the axle 19 with the disc 20 and the foreign object collection chamber 49 with the annular opening 50, are of the same construction as that heretofore described and illustrated in FIG. 3.

In the construction illustrated in FIG. 4, the duct 12 is defined by an internal wall 51. A nozzle box 52 with a manifold 53 is installed at a certain distance from free tips of the turbine blades 42. The manifold 53 has an annular cavity and is integral with the wall 51 of the duct 12.

The nozzle box 52 is in the thickened portion of the manifold 53 and is formed by shaped vanes (not shown) equally spaced around the shroud 41. The nozzle box 52 is disposed between the manifold 53 and the turbine blades 42.

Provided in the thickened portion of the integrally made walls of the collection chamber 49 and the manifold 53 are ducts 54 which run substantially parallel to the longitudinal axis A—A. These ducts 54 are intended for communicating the manifold 53 and the nozzle box 52 with the atmosphere. In an external wall 55 of the air intake 3 are openings 56 serving to communicate the nozzle box 52 and the manifold 53 with the atmosphere. The openings 56 are provided with screens (not shown) for trapping foreign objects.

Each opening 56 has a flap 57 intended for closing the opening 56 when the apparatus 1 is not in operation.

The openings 56 are connected with the ducts 54 through a duct 58 which is disposed in a pod 4a between an internal wall 59 and the external wall 55 of the air intake 3.

Each flap 57 is provided with a spring 60 serving to close the flaps 57 of the openings 56 when the apparatus 1 is not in operation.

Disposed opposite the turbine blades 42 is a tapered wall 61 which connects the manifold 53 with the wall 51 of the duct 12.

In conjunction with the shroud 41, the tapered wall 61 defines a duct 62 intended for delivery of air from the turbine blades 42 into the duct 12.

In the given embodiment, the construction of the apparatus 1 is most simple. Moreover, the apparatus needs no control means to cut in and out the delivery of air to the turbine blades 42. The beginning and stopping of the air delivery is accomplished automatically as a function of the air pressure in the duct 12. This pressure depends upon the speed of an aircraft. The given embodiment is economical as it does not require air bleeding from the compressor of the engine 4.

Figure 5:
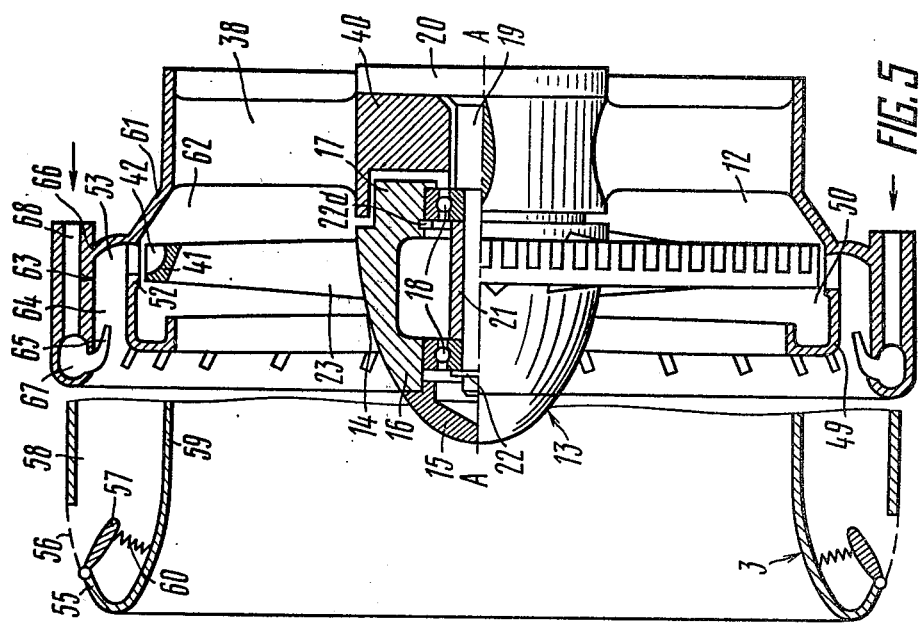
FIG. 5 is a diagrammatical view, partly in longitudinal section, of part of an air intake and an apparatus according to the present invention, comprising a shroud with turbine blades arranged thereon, which is rigidly secured on rotor blades, and also a nozzle box and a manifold communicating with the compressor and atmosphere through an ejector installed at the air flow inlet of the manifold.

Alternatively, the apparatus 1 may be embodied as shown in FIG. 5. In this case, the rotor 13, the radial struts 38 with the annular portion 40, the axle 19 with the disc 20, the foreign object collection chamber 49 with the opening 50 for entry of foreign objects, the nozzle box 52, the manifold 53, the tapered wall 61 and the duct 62, and also the air intake 3 with the walls 55 and 59, openings 56, flaps 57, springs 60 and the duct 58 are of the same construction as that heretofore described and illustrated in FIG. 4.

In the embodiment of the apparatus 1 according to FIG. 5, the compressor 5 of the engine 4 and the atmosphere communicating with the nozzle box 52 serve as a source of air.

In such an embodiment, an ejector 63 is installed at the air inlet of the manifold 53.

The ejector 63 serves to deliver air to the nozzle box 52 and manifold 53 both from the compressor 5 of the engine 4 and the atmosphere through the openings 56.

The ejector 63 is provided with an annular mixing chamber 64 equally spaced along the circumference of a nozzle 65. The annular mixing chamber 64 is arranged concentrically in relation to the foreign object collection chamber 49 and communicates with the atmosphere through the openings 56 and the duct 58. The annular mixing chamber 64 is defined internally by a wall of the foreign object collection chamber 49 and externally, by a wall 66 provided with a thickened portion.

An annular cavity 67 is provided in the thickened portion of the wall 66. The annular cavity 67 is connected with the nozzles 65 and ducts 68 also made in the thickened portion of the wall 66.

The ducts 68 run substantially parallel to the axis A—A and are intended for connection of the annular cavity 67 to the pipeline 32 and for delivery of air to this cavity from the compressor 5 of the engine 4.

The annular cavity 67 serves to uniformly distribute the air that enters the nozzles 65 through the pipeline 32 and the ducts 68. The nozzles 65 are intended to increase the velocity of air delivered from the compressor 5 to the mixing chamber 64 of the ejector 63.

The passage cross-sections of the mixing chamber 64 and nozzles 65 are selected so that the velocity of air delivered through the manifold 53 and the nozzle box 52 to the turbine blades 42 is optimum for obtaining the greatest possible efficiency of operation of the drive of the rotor 13.

In the given embodiment, the operation of the apparatus 1 is accomplished independently of the aircraft speed with an essentially small amount of air being bled from the compressor 5.

The apparatus 1 in the given embodiment proves to be sufficiently versatile and substantially economical in operation.

The apparatus 1 embodied according to the present invention as illustrated in FIGS. 1 and 2 operates in the following manner.

The electric-actuated valve 33 is opened concurrently with the starting of the engine 4 or before the landing of an aircraft. To this end, the electric-actuated valve 33 should be energized.

From the compressor 5 of the engine 4, compressed air flows through the pipeline 32 and the radial duct 28 and enters the manifold 29. Then, from the manifold 29, air is delivered through the shaped vanes of the nozzle box 30 to the turbine blades 27. Due to the interaction with the air flow passing from the nozzle box 30, the turbine blades 27 start to rotate, thereby causing the rotor 13 with its radial blades 23 to rotate as well.

The rotor rotates in such a direction that the portion of each blade 23 which is disposed on the side of the air intake 3 moves towards that portion of an adjacent blade 23 which is disposed on the side of the engine 4.

When the rotor 13 with its blades 23 installed with the heretofore described angular pitch is rotating in such a manner, all the foreign objects which entered the air intake 3 are thrown away in the direction opposite the location of the engine 4.

This takes place due to the fact that while moving towards the engine 4, a foreign object encounters in its path one of the blades 23. The blade 23 always comes in contact with a foreign object by that surface which faces the air intake 3.

In a time required for each blade 23 to turn through an angle overlapping the clearance between the adjacent blades, any foreign object will fly a distance less than the projection of the blade 23 on the plane passing through the axis A—A.

An expelled foreign object may at once get into the foreign object collection chamber 34 through the opening 37. However, an expelled foreign object may be once again entrained by the air flow due to which it will not at once get into the foreign object collection chamber 34. In this case, the foreign object acted upon by gravity and the centrifugal force applied thereto at the impact with the blade 23 will be nearer to the wall 25 of the duct 12 than before the impact.

Besides, the foreign object which is again entrained by the air flow is not able to accelerate to the same speed it had before the impact. Therefore, each subsequent impact of the foreign object with one of the blades 23 brings it nearer to the opening 37 for entry of foreign objects into which it will finally almost inevitably go, failing to fly through the blades 23 of the rotor 13.

After having passed through the turbine blades 27, the air which caused the rotor 13 to rotate is expelled to the atmosphere through the raidal duct 31.

After an aircraft has taken off, there is no danger of entry of foreign objects into the power plant from the ground or airfield. Therefore, the electric-actuated valve 33 should be deenergized and the delivery of air from the compressor 5 of the engine 4, shut off.

Inasmuch as after the above operations no air is delivered to the turbine blades 27, the rotor 13 starts to rotate in reverse actuated by the air flow that passes through the duct 12 and acts on the blades 23. As a result, the hydraulic resistance in the duct 12 is decreased and the nonuniformity of air velocity, pressure and temperature fields is diminished due to the mixing of air by the blades 23.

After the engine 4 has been switched off, the electric-actuated valve 33 should also be deenergized. Thereafter, the cover 36 should be opened to empty the storage pocket 35 of foreign objects which entered from the collection chamber 34.

In an embodiment of the apparatus 1 shown in FIG. 3, the electric-actuated valve 33 should be opened and compressed air should be delivered from the compressor 5 through the pipeline 35 in the same manner as it is done in the apparatus 1 embodied as shown in FIGS. 1 and 2.

From the pipeline 32, compressed air passes through the ducts 46 into the annular cavity of the manifold 44. Then, from the manifold 44, air is delivered through the shaped vanes of the nozzle box 43 to the turbine blades 42 arranged on the shroud 41.

Due to the interaction with the air flow passing from the nozzle box 43, the turbine blades 42 start to rotate, thereby causing the rotor 13 with its radial blades 23 to rotate as well.

Rotation of the rotor 13 with its blades 23 and expelling of foreign objects by these blades into the collection chamber 49 through the opening 50 for entry of foreign objects are accomplished in the same manner as in the apparatus 1 embodied as shown in FIGS. 1 and 2.

If a foreign object runs against the surface of the shroud 41 facing the axis A—A, it will also be thrown in the direction opposite the location of the engine 4 and will get into the collection chamber 49 through the opening 50 so far as the above mentioned surface is made in the form of a convergent cone.

After having passed through the turbine blades 42, the air that caused the rotor 13 to rotate is expelled through the annular duct 47 to the atmosphere.

Cutting the apparatus 1 out of operation by deenergizing the electric-actuated valve 33 and emptying the storage pocket 35 in the apparatus embodied according to FIG. 3 is accomplished in the same manner as in the apparatus 1 embodied according to FIGS. 1 and 2.

In an embodiment of the apparatus 1 according to FIG. 4, the delivery of air for rotating the rotor 13 with its blades 23 is accomplished only in that range of aircraft speeds at which the static pressure of air in the duct 12 is less than the atmospheric pressure.

However, inasmuch as the danger of entry of foreign objects into a power plant is often reduced with an increase of the aircraft speed, the apparatus 1 embodied according to FIG. 4 may prove to be most advantageous, for example, for airplanes having comparatively low take-off and landing speeds. At the start up, the engine 4 commences to draw in air through the air intake 3, thereby creating a rarefaction in the duct 12. At this point the flaps 57 overcome the effort of the springs 60 and uncover the openings 56, thereby communicating the turbine blades 42 to the atmosphere through the ducts 58 and 54, the manifold 53 and the nozzle box 52.

Rotation of the rotor 13 with its blades 23 and impelling of foreign objects into the collection chamber 49 through the opening 50 for entry of foreign objects, are accomplished in the same manner as in the apparatus 1 embodied according to FIG. 3.

After having passed through the turbine blades 42, the air that caused the rotor 13 to rotate is expelled through the duct 62, defined by the tapered wall 61, into the duct 12. Discharge of air from the turbine blades 42 into the duct 12 increases the rate of air flow into the engine and augments the thrust thereof.

The apparatus 1 is cut out of operation when the speed of an aircraft increases to such a value point at which the dynamic head becomes approximately equal to that rarefaction which is created in the duct 12 with the engine 4 operating at the same rating on an immovable aircraft.

A similar process takes place at the landing of an aircraft. In this case, with a decrease of the aircraft speed, there is created a rarefaction sufficient for uncovering the openings 56 and causing the rotor 13 with its blades 23 to rotate. Further, the apparatus 1 will operate in the same manner as here-tofore described. The apparatus will cut out of operation concurrently with the shut-down of the engine 4.

In an embodiment of the apparatus 1 according to FIG. 5, the electric-actuated valve 33 should be opened by energizing the latter concurrently with the starting of the engine 4 or before the landing of an aircraft.

From the engine compressor 5, compressed air passes through the pipeline 32 and the ducts 68, and enters the annular cavity 67. Then, through the nozzles 65, compressed air enters the mixing chamber 64 of the ejector 63.

Rarefaction created in the annular cavity 67 under the action of air jets passing from the nozzles 65 ensures suction of air into the annular cavity 67 from the atmosphere.

Under the action of this rarefaction and due to the rarefaction created in the duct 12 during operation of the engine 4, the flapdoors 57 overcome the effort of the springs 60 and uncover the openings 56 in the external wall 55 of the air intake 3. The streams of air delivered from the atmosphere and from the compressor 5 mix in the chamber 64 and enter the manifold 53. From the manifold 53 the air flow is directed through the shaped vanes of the nozzle box 52 to the turbine blades 42.

Rotation of the rotor 13 with its blades 23, impelling of foreign objects by these blades into the collection chamber 49 through the opening 50 for entry of foreign objects and also the discharge of air from the turbine blades into the duct 12 are accomplished in the same manner as in the apparatus 1 embodied according to FIG. 4.

The apparatus 1 is cut out of operation by deenergizing the electric-actuated valve 33.

It has been found in a tested embodiment of the invention that the apparatus for preventing entry of foreign objects into an aircraft power plant proved to be substantially reliable in operation, being essentially simple in design.

The proposed apparatus ensures a substantially reliable protection of the engine and due to its versatility, may be used on various vehicles equipped with gas turbine engines.

It is to be understood that various modifications may readily be made in the apparatus for preventing entry of foreign objects into an aircraft power plant by those skilled in the art without departing from the scope of the invention.

What is claimed is:

1. An apparatus for preventing entry of foreign objects into an aircraft power plant, incorporating an air intake and an engine with a compressor installed in tandem and a duct disposed inbetween, comprising: a rotor installed in said duct; a drive kinematically associated with said rotor; a centre body of said rotor; radial blades of said rotor secured on said centre body and installed at an angle to the plane which is square with the longitudinal axis of said rotor; said radial blades being installed with an angular pitch relative to one another determined from the equation:

$$\Psi = K_1 \cdot \cos\left(\text{arc tg} \frac{K_2}{\sqrt{\frac{\sigma}{\gamma} \cdot n}}\right),$$

where
  $\psi$ is the angular pitch of blades;

$K_1$ is the dimensionless coefficient dependent on the shape of blades;

$K_2$ is the dimensionless coefficient dependent on the ratio of diameters of the duct and centre body to the maximum possible air flow rate at the engine inlet;

$\sigma$ is the ultimate strength of the material of blades;

$\gamma$ is the specific weight of the material of blades;

$n$ is the dimensionless factor of safety of blades;

a foreign object collection chamber; an opening in said collection chamber intended for entry of foreign objects and disposed in front of said radial blades in the direction of air flow.

2. An apparatus according to claim 1 which also comprises: a shroud rigidly secured on tips of said radial blades; turbine blades arranged on said shroud and having free tips; a nozzle box with a manifold installed at a certain distance from the free tips of said turbine blades; an air source: said nozzle box communicating with said air source for delivery of air to said turbine blades.

3. An apparatus according to claim 2 wherein said compressor of said engine serves as said air source.

4. An apparatus according to claim 2 wherein said air source is essentially the atmosphere communicating with said nozzle box through openings made in the external wall of said air intake, each being provided with a flap door for its closing when the apparatus is not in operation.

5. An apparatus according to claim 2 wherein said air source is essentially said compressor of said engine and the atmosphere communicating with said nozzle box through an ejector installed at the air flow inlet of a manifold.

* * * * *